United States Patent [19]

Antimovski

[11] 4,430,553
[45] Feb. 7, 1984

[54] HEAT ACCUMULATING IRON

[76] Inventor: Antim Antimovski, u/"Oslo", 91000 Skopje, Yugoslavia

[21] Appl. No.: 195,592

[22] Filed: Oct. 9, 1980

[30] Foreign Application Priority Data

Oct. 9, 1979 [YU] Yugoslavia ............................ 2447/79

[51] Int. Cl.$^3$ ...................... D06F 75/24; D06F 75/26; H05B 1/02; F28F 27/00
[52] U.S. Cl. ........................................ 219/258; 38/82; 38/88; 38/89; 165/96; 219/242; 219/247; 219/252; 219/462; 219/530; 219/540
[58] Field of Search ........ 219/540, 530, 462, 245–259, 219/242; 38/82, 83, 88, 89; 165/96

[56] References Cited

U.S. PATENT DOCUMENTS

| | | | |
|---|---|---|---|
| 66,535 | 7/1867 | Taylor | 38/83 |
| 386,259 | 7/1888 | Olp | 38/83 |
| 1,552,813 | 9/1925 | Amman | 219/530 X |
| 1,703,803 | 2/1929 | Widstrom | 165/96 X |
| 2,010,180 | 8/1935 | De Ferranti | 165/96 X |
| 3,045,980 | 7/1962 | Isham | 165/96 |

*Primary Examiner*—A. Bartis
*Attorney, Agent, or Firm*—Watson, Cole, Grindle & Watson

[57] ABSTRACT

A cordless flatiron includes a sole plate with an exposed bottom surface forming an ironing surface and a top surface including a number of projections extending upwardly therefrom. A protective hood attached to the periphery of the top surface of the sole plate forms an evacuated, sealed chamber thereabove and a heat storage element is positioned in the chamber so as to be movable toward and away from the projections of the sole plate. The heat storage element is heated by an electric heating rod extending therein. A temperature responsive regulator element positioned between the heat storage element and the top of the sole plate and responsive to the temperature of the sole plate is arranged by its configuration to position the heat storage with respect to the upper ends of the projections of the sole plate and thus determine whether or not heat is conducted from the heat storage element to the projections of the sole plate and to the ironing surface of the sole plate. An adjustable temperature selector is provided for selecting the temperature of the sole plate and an adjustable heat quantity selector provides for switching off the current to the heating rod (when the flatiron is connected to an electrical power supply) based on the temperature of the heat storage element. A reflective foil heat radiation barrier is positioned between the sole plate and heat storage element to shield the sole plate from heat radiation from the heat storage element and to limit transfer of heat from the heat storage element to the soleplate essentially to that transmitted through the projections.

14 Claims, 6 Drawing Figures

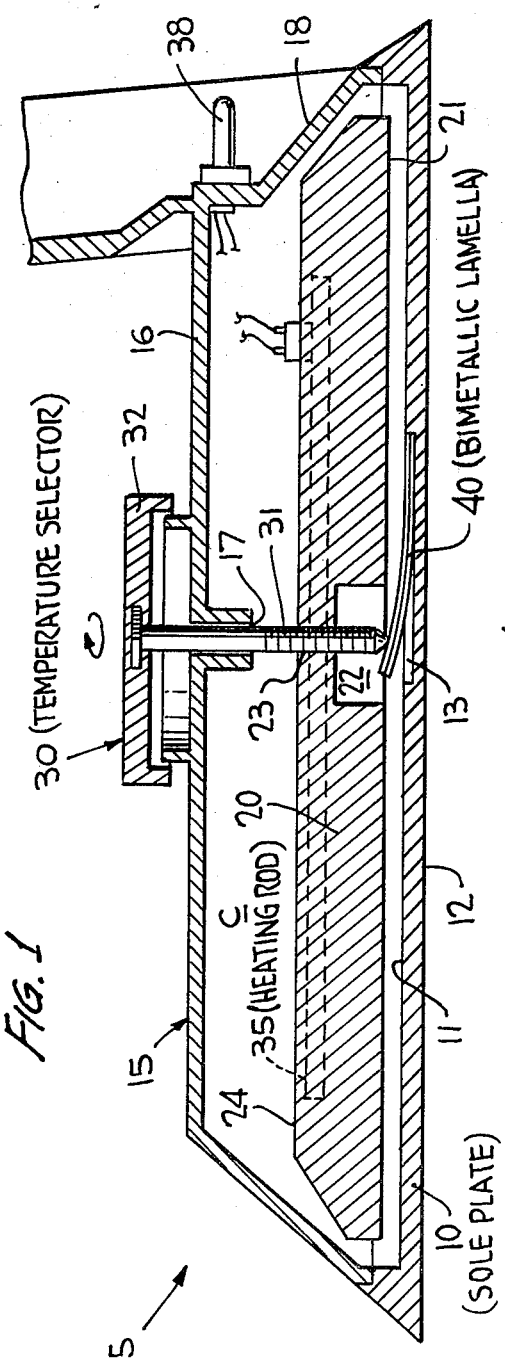
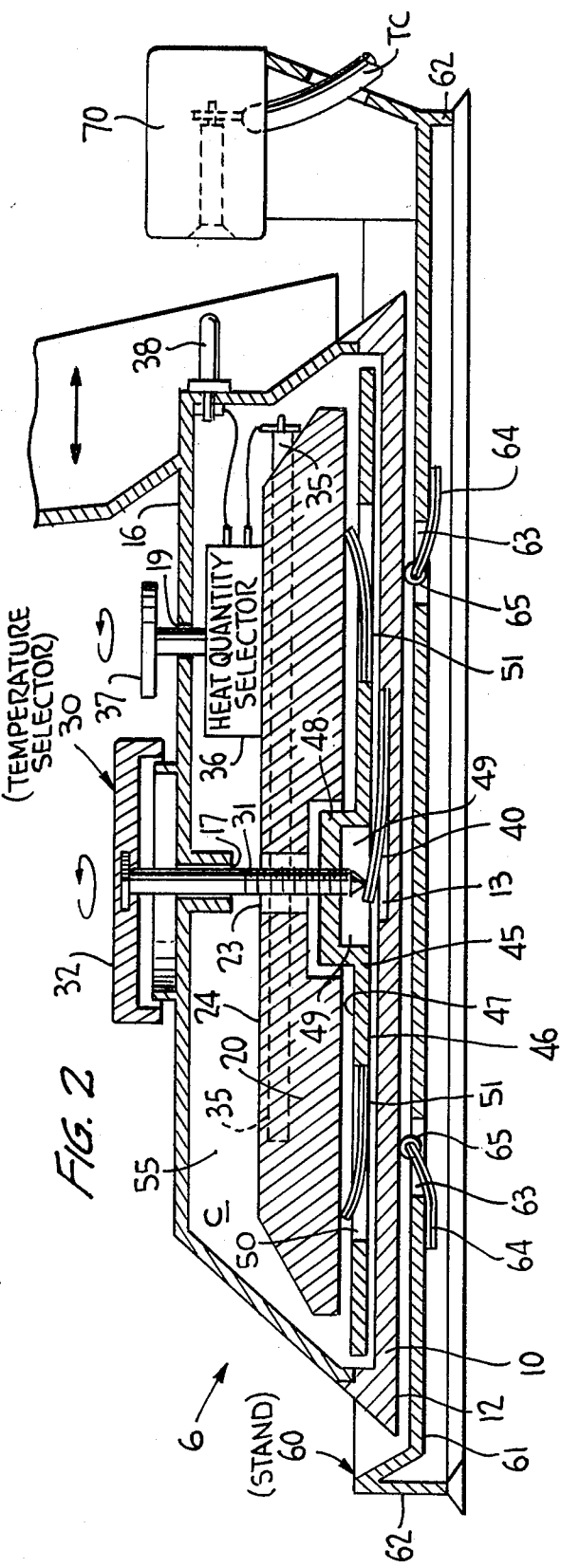

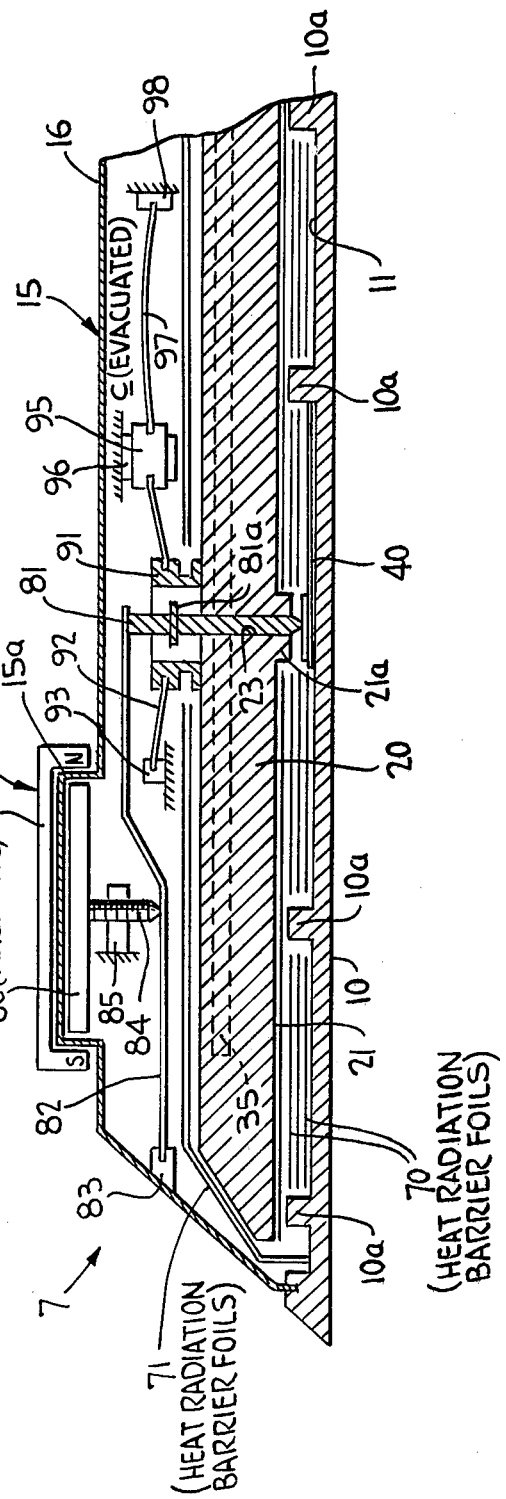

HEAT ACCUMULATING IRON

BACKGROUND OF THE INVENTION

1. Field of the Invention

The present invention relates to a cordless electric flatiron which utilizes an internal heat storage element and a temperature regulator.

2. The Prior Art

Electric flatirons which include internal heat storage elements that are electrically heated when the flatirons are in use are quite well known. However, such known flatirons are only operable if they are continuously connected to an electrical outlet, and the attached electrical cables make them at times very cumbersome to use. In addition, the electrical cables themselves can be easily damaged and they also tend to make these flatirons quite bulky to store away.

On the other hand, a cordless electric flatiron has been marketed which avoids the noted problems. However, this known cordless flatiron can only be used in conjunction with a special, expensive stand, and this flatiron must be frequently placed on this special stand because its heat capacity is very small.

It is thus an object of the present invention to provide a cordless electric flatiron which is capable of storing a great deal of heat, such that it need be connected to a source of electrical power only relatively infrequently.

SUMMARY OF THE INVENTION

According to the present invention, the cordless electric flatiron includes an electrically heated heat storage element which is mounted in a chamber in the iron to be movable with respect to the bottom sole plate of the iron, as well as a temperature-responsive regulator element which can, based on the temperature of the sole plate, move the heat storage element (or an intermediate element positioned between the sole plate and the heat storage element) toward and away from the sole plate to control the amount of heat transferred by conduction from the heat storage element to the sole plate and thus the temperature to which the sole plate is heated. In addition, the inventive cordless electric flatiron includes a temperature selector which controls how (when) the temperature-responsive regulator element moves the heat storage element (or an intermediate element) with respect to the sole plate and thus the temperature to which the sole plate will be heated by the heat storage element.

The internal heat storage element of the inventive cordless electric flatiron can be safely heated to a relatively high temperature, as a result of which a large quantity of heat may be stored therein. This means the flatiron need be connected to a source of electrical power (which is needed to electrically heat the internal heat storage element by resistance heating) only infrequently.

The invention will now be better understood by reference to the accompanying drawings taken in conjunction with the following discussion.

DESCRIPTION OF THE DRAWINGS

In the drawings,

FIG. 1 shows a diagrammatic side view through the operative portion of a flatiron constructed according to one embodiment of the present invention, FIG. 2 shows a diagrammatic side through the operative portion of a flatiron constructed according to another embodiment of the present invention, as well as a diagrammatic side view through a flatiron stand that can be advantageously used therewith, FIG. 3 shows a diagrammatic side view through the front end of a flatiron constructed according to a third embodiment.

DETAILED DESCRIPTION OF THE PREFERRED EMBODIMENTS

Figure 4:
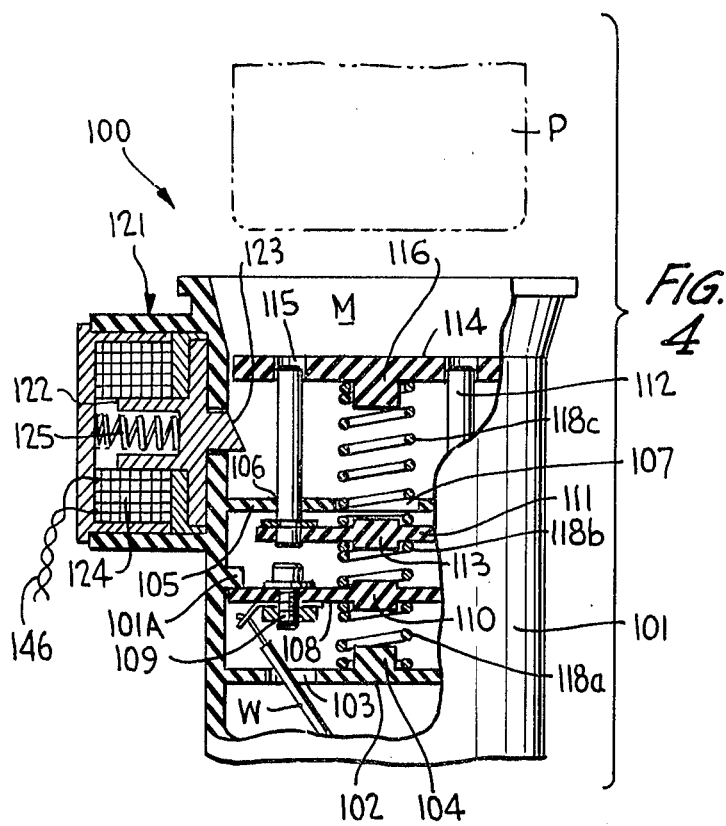
FIG. 4 shows, on an enlarged scale, a partially broken away view of an electrical socket which can be used on the rear end of the flatiron embodiment as depicted in FIGS 3 and 5.

A first embodiment of flatiron according to the present invention, generally indicated by the numeral 5, is diagrammatically shown in FIG. 1. It includes a bottom sole plate 10, a protective hood 15 and a heat storage element 20. The hood 15 is connected to the sole plate 10 around its periphery so as to form a chamber C therebetween, and the heat storage element 20 is mounted in the chamber to be movable toward and away from the flat top surface 11 of the sole plate 10. In this regard, a control rod 31 of a temperature selector 30 threadingly extends through a threaded bore 23 in the center of the heat storage element 20, the lowermost tip of the control rod 31 terminating in a cavity 22 formed in the flat bottom face 21 of the heat storage element. The upper end of the control rod 31 slidingly extends through an opening 17 in the roof 16 of the hood 15 and is fixedly connected to a rotatable knob 32. Rotation of the knob 32 will change the positioning of the heat storage element 20 along the length of the control rod 31 and thus the degree to which the lowermost tip of the control rod 31 is recessed within the cavity 22.

The bottom surface 12 of the sole plate 10 is flat and forms the useful ironing surface of the flatiron.

The heat storage element 20 is itself heated by an electrical heating rod 35 which extends within the heat storage element, the heating rod 35 being electrically connected to be supplied with electrical power from electrical plug 38 which extends outwardly from the rear side 18 of the hood 15.

An indented portion 13 is formed in the top surface 11 of the sole plate 10, and a temperature-responsive regulator in the form of a bimetallic lamella 40 is located therein. A first end of the bimetallic lamella 40 is fixedly located in the indented portion 13 while the second end, which is located below the lowermost tip of the control rod 31, is free to move upwardly as a result of bending of the bimetallic lamella. When in a cold state, e.g., when at room temperature, the bimetallic lamella 40 will tend to be in a flattened condition such that the second end thereof will be located generally within the indented portion 13, but as its temperature rises in accordance with a rise in the temperature of the sole plate 10, the bimetallic lamella 40 will bend, causing the second end to move upwardly within chamber C. Once the second end of the bimetallic lamella 40 contacts the lowermost tip of the control rod 31, further bending of the bimetallic lamella 40 will force the control rod to slide upwardly within the opening 17 and the heat storage element 20 to be concurrently moved away from the top surface 11 of the sole plate 10.

Operation of this embodiment of the inventive flatiron occurs as follows. The user first of all sets the knob 32 of the temperature selector 30 to the desired temperature for the bottom plate 10. Then the user connects the electrical plug 38 to a suitable electrical socket (see FIG. 2) until the heat generated by the heating rod 35 has supplied the desired amount of heat to the relatively massive heat storage element 20. The flow of current to the heating rod 35 will be switched off by a switch (not shown) and the electrical connection between the electrical plug 38 and the electrical socket will then be manually disconnected. During this period of time, and because the flat bottom face 21 of the heat storage element 20 will have been initially in full contact with the flat top surface 11 of the sole plate 10, the sole plate 10 will be heated up due to heat conduction. Concurrently the bimetallic lamella 40 will bend, and eventually its second end will contact the lowermost tip of the control rod 31 (the time it takes for this to happen being determined by the setting of knob 32) and thereafter will push it and the heat storage element 20 away from the sole plate 10. Once the flat bottom face 21 of the heat storage element is moved out of direct contact with the flat top surface 11 of the sole plate 10, heat transfer from the heat storage element to the bottom plate 10 will be drastically reduced, and the flatiron will be ready for use.

As the flatiron is used, the sole plate 10 will cool and concurrently the bimetallic lamella 40 will bend back towards its flattened state, such that the flat bottom face 21 of the heat storage element will again be allowed to directly contact the flat top surface 11 of the sole plate 10. Then, since the heat storage element 20 will be still capable of supplying heat to the sole plate 10, the sole plate 10 will heat up again to its desired temperature. As a result of this cyclic bending of the bimetallic lamella 40 and the cyclic movement of the heat storage element 20 into and out of contact with the top surface 11 of the sole plate 10, the temperature of the sole plate 10 will be advantageously kept within a relatively narrow temperature range. Only when the temperature of the heat stroage element 20 drops to the point that direct contact with the top surface 11 of the sole plate 10 will not enable the sole plate to be reheated to its desired temperature will the flatiron then have to be reconnected to a source of electrical current.

FIG. 2 shows another embodiment of flatiron according to the invention, generally indicated by numeral 6, together with a flatiron stand 60 with which it can be advantageously used. This flatiron 6 is constructed to provide enhanced control of the heat flow from the heat storage element 20 to the sole plate 10, which control may be needed when the sole plate 10 is to be heated to a relatively low ironing temperature, whereas the flatiron stand 60 is useful when the flatiron is not to be actively used for extended periods during ironing.

More specifically, the flatiron 6 includes the same basic elements as does the flatiron 5 of FIG. 1; however, the bore 23 in the heat storage element 20 is larger than the diameter of the control rod 31, such that the control rod slidingly extends therethrough, and the control rod 31 is instead threadingly engaged in a bore of an intermediate element 45 which is positioned between the heat storage element 20 and the sole plate 10. This intermediate element 45 has a flat bottom face 46 and a flat top face 47, as well as a hat portion 48 which is shaped to fit within the cavity 22 in the heat storage element 20. The lowermost tip of the control rod 31 terminates in the cavity 49 formed in the hat portion 48. The intermediate element 45 also includes a number of through-openings 50 and associated bimetallic lamella 51, the first ends of which are fixedly connected in the intermediate element and the second ends of which can move within the through-openings.

The flatiron also includes a number of flexible suspension elements 55 (only one shown in FIG. 2) which suspend the heat storage element 20 from the roof 16 of the hood 15. In addition, a heat storage quantity selector 36, which is connected between the heating rod 35 and the electrical plug 38, is mounted on the top face 24 of the heat storage element 20. This heat storage quantity selector 36 includes an adjustment knob 37 which extends through a hole 19 in the roof 16 of the hood 15 to enable the user of the flatiron to predetermine the quantity of heat to be stored in the heat storage element 20.

The flatiron stand 60 on which the flatiron is positionable includes a floor 61, feet 62 located at the periphery of the floor 61, and electrical socket 70 which is supplied with electrical power by a tripolar cable TC. The floor 61 includes a number of through-openings 63 and associated bimetallic lamella 64, the first ends of which are fixedly connected to the floor 61 and the second ends of which mount rollers 65 which are free to move in these through-openings, depending on the degree of bend in the associated bimetallic lamella. This bending will in turn be based on the temperature of the floor 61.

Operation of this embodiment of the inventive flatiron occurs as follows. The user sets both of the knobs 32 and 37 to the desired settings and connects the electrical plug 38 to a suitable electrical socket until the amount of heat stored in the heat storage element 20, as selected by knob 37, is achieved, at which time the heat quantity selector 36 will switch off the current to the heating rod 35 and the user will manually disconnect the flatiron from the electrical socket. During this time, and because the heat storage element 20 will have initially been in full contact with the flat top face 47 of the intermediate element 45 and the flat bottom face 46 of the intermediate element 45 will have initially been in full contact with the flat top surface 11 of the sole plate 10, the sole plate 10 will be heated up due to heat conduction. Concurrently the bimetallic lamella 40 and 51 will start to bend, and eventually they will respectively cause the intermediate element 45 to be moved out of contact with the sole plate 10 and the heat storage element 20 to be moved out of contact with the intermediate element 45. The intermediate element will then act to reduce the heat transfer from the heat storage element 20 to the sole plate 10. This is important in situations wherein the temperature selected by the temperature selector 30 for the bottom plate 10 is relatively low and the heat radiated by the heat storage element 20 towards the sole plate 10 would be greater than that which would have to be dissipated by the sole plate 10 in order to maintain its selected temperature.

When placed on the flatiron stand 60, if the sole plate 10 is not too hot, the flat bottom surface 12 will contact the floor 61 such that heat will be removed from the sole plate 10, thereby allowing it to be rested thereon during ironing. Once it reaches a higher temperature, the bimetallic lamella 64 will heat up and bend until the rollers 65 on their second ends extend upwardly above the floor 61 so as to support the sole plate 10 above the floor 61.

Figure 5:
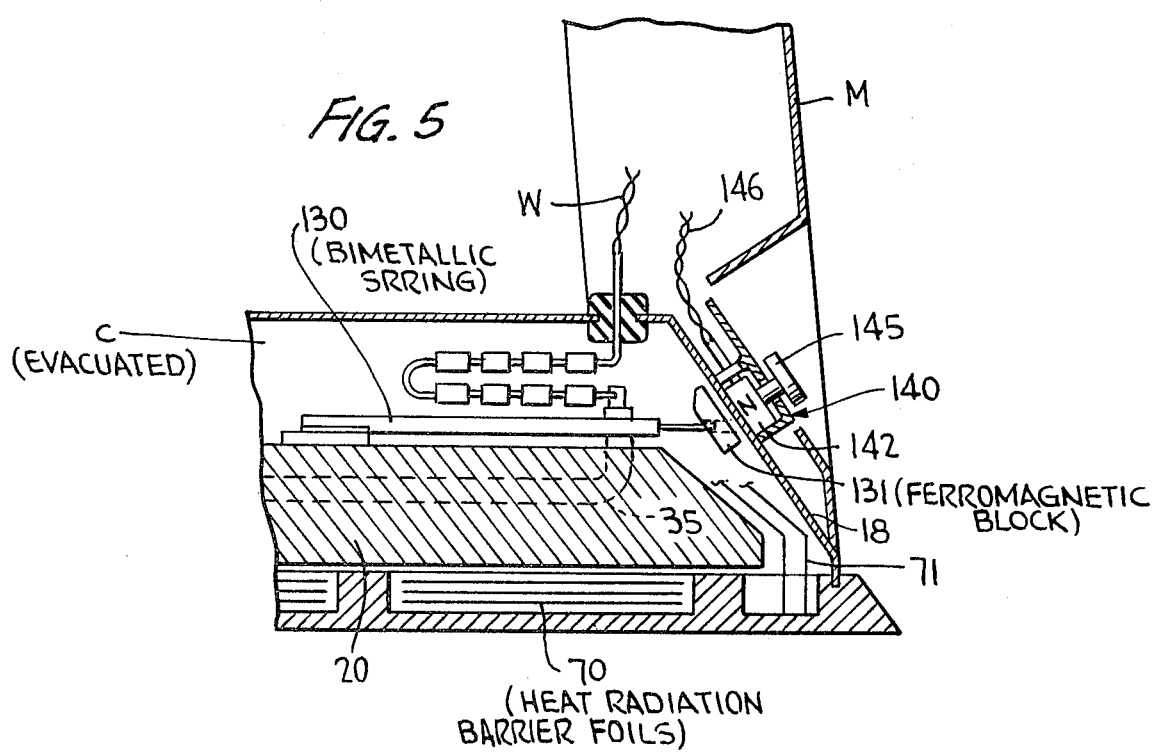
FIG. 5 shows a diagrammatic side view through the rear end of a flatiron shown in FIG. 3.

Turning now to the flatiron embodiment shown in FIGS. 3–6, generally indicated in FIG. 5 by the numeral 7, it is seen to include a bottom plate 10, a protective hood 15 and a heat storage element 20; however, the hood 15 includes no openings therein, such that the chamber C formed between the hood 15 and the bottom plate 10 will be a sealed chamber, and the sealed chamber is in fact evacuated when the flatiron is constructed.

The top surface 11 of the sole plate 10, instead of being entirely flat, includes a number of projections 10a which extend upwardly into the chamber C, each projection having a flat upper end surface facing the bottom face 21 of the heat storage element 20. Located in the areas between the projections 10a are insulating foils 70. These insulating foils will reflect any heat radiated from either the heat storage element 20 or the sole plate 10. As shown in FIG. 3, the topmost foil of the insulating foils 70 can be positioned between the flat upper end surfaces of the projections 10a and the bottom face 21 of the heat storage element 20. This foil will readily transmit heat from the heat storage element 20 to the projections 10a of the sole plate 10 when pressed therebetween, but will reflect any radiated heat from the portions thereof not in physical contact with either element. Additional insulating foils 71 extend upwardly from the sole plate 10 to enclose the sides and most of the top face of the heat storage element 20 and to reflect the heat radiated therefrom.

A heat-resistant control rod 81 of a temperature selector 80 slidingly extends through a bore 23 in the heat storage element 20, the lowermost tip being capable of extending beyond a step 21a of the heat storage element which extends away from the bottom face 21, and the uppermost end being in abutting relationship with the free end of a spring 82. The opposite end of the spring 82 is fixedly attached to the hood 15 by a mount 83. The lower end of a threaded adjustment pin 84, which extends through a threaded bracket 85 located in the chamber C about the sole plate 10, contacts the upper side of the spring 82, and the upper end of the pin 84 is fixedly connected to a magnetized head 86 which fits within a protruding portion 15a in the roof 16 of the hood 15. A magnetized knob 87 is positioned around this protruding portion 15a. The elements 81–87 form the temperature selector 80 for the flatiron. The rotation of the magnetized knob 87 causes the magnetized head 86 to rotate (note: the hood 15 is composed of a non-magnetic material), and thus the downward force on the control rod 81 is adjustable. This in turn controls the temperature to which the bimetallic lamella 40 must be heated before its second end will push the control rod 81 upwardly sufficiently that it will contact the step 21a of the heat storage element 20 and push it out of contact with the uppermost insulating foil, which is itself in contact with the flat upper end surfaces of the projections 10a.

Furthermore, a generally cylindrical element 91 of a snap-placement mechanism 90 is connected to the top face 24 of the heat storage element 20 so as to surround the control rod 81, this element 91 being connected to a mount 93 located in chamber C above the sole plate 10 by a spring 92 and to the movable head 95 of a mount located in the chamber C above the sole plate 10 by a spring 94. The movable head 95 is itself further supported by one end of a spring 97, the opposite end of which is connected to a mount 98 located in the chamber C above the sole plate 10. Elements 91–98 form the snap-placement mechanism 90 which causes the heat storage element 20 to be either positioned in a first position very close to the sole plate 10, i.e., such that it contacts the uppermost insulating foil 70 and presses it against the flat upper end surfaces of the projections 10a, or else is in a second position located at a predetermined distance away therefrom. In this regard, when the flatiron is made ready for initial use (the heat storage element 20 being cold (room temperature)), the snap-placement mechanism 90 will have caused the heat storage element 20 to be in its first position close to the sole plate 10 as indicated in FIG. 3 (note, however, that in FIG. 3 the heat storage element 20, the top insulating foil 70 and the flat upper end surfaces of the projections 10a are shown to be spaced apart from one another for enhanced clarity). When the flatiron is then connected to a source of electrical power, the heating rod 35 in the heat storage element 20 will cause the heat storage element 20 to heat up, and as this occurs heat will pass by conduction through the uppermost insulating foil 10 and into the projections 10a, and thus the temperature of the entire sole plate 10 will rise. Eventually the free end of bimetallic lamella 40 will bend away from the top surface 11 of the sole plate 10 and it will eventually push the rod 81 and then the heating element 20 away from the sole plate 10. At a certain point, the springs 92, 94 and 97 of the snap-placement mechanism 90 will cause the generally cylindrical element 91 (and thus the heat storage element 20 as a whole) to snap quickly further away from the sole plate 10 and into its second, predetermined position away from the sole plate 10. At this point the forces acting on the rod 81 by the bimetallic lamella 40 and the spring 82 (this force being adjustable via pin 84) will be in balance. With the passage of time and as the flatiron is used the sole plate 10 will cool, and the free end of the bimetallic lamella will bend back towards the top surface 11 of the sole plate 10. Concurrently the spring 82 will cause the pin 81 to move towards the sole plate 10. At a certain point a cross bar portion 81a of the control rod 81 will contact the top surface of the heat storage element 20 and cause it to also move towards the sole plate 10. Eventually the snap-placement springs 92, 94 and 97 of the mechanism 90 will cause the generally cylindrical element 91 (and thus the heat storage element 20) to snap quickly back to its initial, first position very close to the sole plate 10 (see FIG. 3).

Figure 6:
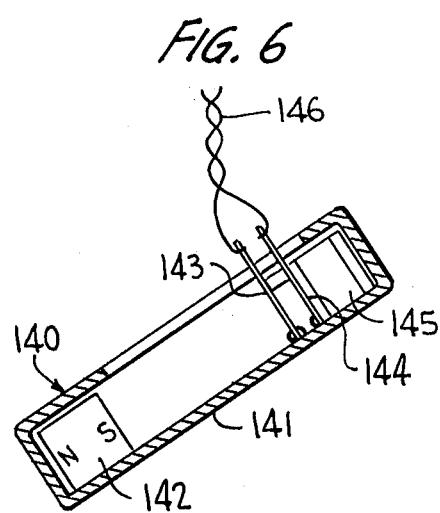
FIG. 6 shows, on an enlarged scale, a view of the temperature indicator device located on the rear end of the flatiron embodiment as depicted in FIG. 5.

It should be noted that electrical power can be supplied to the heating rod 35 via the various elements in the rear end of the flatiron as shown in FIGS. 4–6.

FIG. 4 shows in detail electrical socket 100 which can be mounted on the handle H of the inventive flatiron shown in FIG. 3 for cooperation with an external electrical plug P. The electrical socket includes a cylindrical wall 101, one end of which forms a mouth M for insertion of the plug P, and located within the wall 101 are fixed plates 102 and 105, as well as movable plates 108, 111 and 114. Fixed plate 102, being the farthest from the mouth M, includes two wire holes 103 (only one shown in FIG. 4) through which the two electrical wires for the heating rod 35 in the heat storage element extend, and an abutment stop 104 which extends towards the mouth M. Fixed plate 105, which is located closer to the mouth M, includes two pin holes 106 (only one is shown in FIG. 4) and a central opening 107. The first movable plate 108, which is positioned between the fixed plate 102 and a stop ridge 101a which extends inwardly from the cylindrical wall 101, includes two connector terminals 109 (only one is shown in FIG. 4)

and an abutment block portion 110 in its center. The second movable plate 111, which is positioned between the first movable plate 108 and the fixed plate 105, includes two electrical pins 112 which extend through the pin holes 106 in the fixed plate 105 and an abutment block portion 113 in its center. The third movable plate 114, which is positioned between the fixed plate 105 and the mouth M, includes two pin holes 115 and an abutment stop 116 which extends towards the abutment stop 104 of the fixed plate 102. A first coiled spring 118 extends between the abutment stop 104 and the abutment block portion 110 of the first movable plate 108, a second coiled spring 118b extends between the abutment block portion 113 of the second movable plate 111, and a third coiled spring 118c extends from the abutment block portion 113 of the second movable plate 111, through the central opening 107 in the fixed plate 114, and to the abutment stop 116 of the third movable plate 114. As the plug P is inserted into the mouth M of the cylindrical wall 101 of the socket 100, the three movable plates 108, 111 and 114 are pushed towards the fixed plate 102 against the force of springs 118a, 118b and 118c until the electrical pins 112 come into contact with the connector terminals 109 on the first movable plate 108 so as to allow electricity to flow from the electrical pins 112 to the connector terminals 109, and thereafter through the wires W which extend through the wire holes 103 and connect to the heating rod 35.

It can also be seen from FIG. 4 that the electrical socket 100 includes a control mechanism which is attached to the outside of the cylindrical wall 101, the control mechanism including a housing 121 which includes a movable lock element 122 that can move within an electrical coil 124 towards and away from the cylindrical wall 101 such that the head 123 thereon can extend through an opening in the cylindrical wall 101 to project into the interior of the cylindrical wall 101 at a location between the fixed plate 105 and the mouth M. A spring 125 biases the head 123 towards the cylindrical wall 101. Once the plug P has pushed the movable plate 114 over and past the head 123 into the plug 100, the head 123 will lock the movable plate 114 in this retracted position within the socket 100 and thus allow the electrical current to flow from the plug P through the electrical pins 112 until an electrical signal is received in coil 124 via line 146, at which point the lock element 122 will be moved away from the cylindrical wall 101. The head 123 will move out of the interior of the socket 100, releasing the movable plate 114. The springs 118a, 118b and 118c will then cause the movable plate 114 to move the plug P out of the socket 100.

Referring now in more detail to the showings in FIGS. 5 and 6, the rear end of the flatiron is seen to include a handle H (the mounting of the socket 100 thereon is not indicated). In this flatiron one end of a bimetallic spring 130 is attached to the heat storage element 20 and the opposite (free) end, which mounts a ferro-magnetic block 131, is located near the inside surface of the rear side 18 of the hood 15. At the same time, an indicator device 140 is attached to the outside surface of the rear side of the hood 15, the indicator device including an elongated housing 141 which is located (see FIG. 5) on the rear side 18 of the hood 15 and oriented so as to extend in the same direction that the magnet 131 is moved by the spring 130 as it is heated and cooled, a magnet 142 which is slidable within the housing 141, and two electrical contacts 143, 144 which are movably located within the housing 141, by a handle 145. As the heat storage element 20 heats up, the bimetallic spring 130 will bend, thereby causing the ferromagnetic block 131 and consequently the magnet 142 to move within the housing 141. Once the magnet 142 pushes the electrical contact 143 into engagement with electrical contact 144 (the positioning of the electrical contacts 143 and 144 being determined by the handle 145), an electrical signal will flow through the wires 146 to coil 124 (see FIG. 4), thus allowing the springs 118a, 118b and 118c to disconnect the plug P from the socket 100 as noted above.

Although a number of embodiments of the inventive flatiron have been discussed in detail, it will be obvious the numerous modifications therein can be made and still fall within the scope of the appended claims.

I claim:

1. A cordless flatiron which includes
a bottom sole plate and a protective hood attached to said sole plate to form an evacuated, sealed chamber therebetween, said sole plate including an exposed bottom surface which defines an ironing surface and a top surface which faces the sealed chamber, the top surface having a number of projections which extend away from the top surface into the chamber, each of the projections having a flat upper end surface,
a heat storage element positioned in the sealed chamber, said heat storage element having a top face and a planar bottom face, said heat storage element being movable toward and away from the upper end surfaces of the projections extending away from the top surface of said sole plate such that its bottom face will be in and out of heat conduction relationship therewith,
an electric heating means positioned in contact with said heat storage element to heat said heat storage element, said electric heating means being electrically connected to an electrical connector means on the hood and which is removably connectable with an external electrical supply means,
a temperature-responsive regulator element positioned between said heat storage means and the top surface of said sole plate, the regulator element being capable of moving said heat storage element with respect to the upper end surfaces of the projections extending away from the top surface of said sole plate and thus control the temperature to which said sole plate is heated by said heat storage element, said regulator element being responsive to the temperature of said sole plate, and
a heat radiation barrier means positioned between said heat storage element and said sole plate, said heat radiation barrier means being shaped such that it shields the entire sole plate, including its projections, from heat radiation from the heat storage element when the heat storage element is moved away from its closest position with respect to said sole plate by the temperature-responsive element yet forms a direct heat conductive path between the bottom of the heat storage element and the upper end surfaces of the projections of said sole plate, while shielding the areas of the sole plate between said projections, when the heat storage element is at its closest position with respect to said sole plate.

2. A cordless flatiron as defined in claim 1 wherein the heat radiation barrier means comprises a number of heat radiation barrier foils.

3. A cordless flatiron as defined in claim 2 wherein said regulator element comprises a bimetallic lamella.

4. A cordless flatiron as defined in claim 3 wherein some of the heat radiation barrier foils have openings through which the projections extending away from the top surface of said sole plate extend, such that they are located between these projections.

5. A cordless flatiron as defined in claim 4 wherein the top one of the heat radiation foils is located between the flat upper end surfaces of the projections extending away from the top surface of said sole plate and the bottom face of said heat storage means.

6. A cordless flatiron as defined in claim 5 wherein an elongated control element slidingly extends through a bore in said heat storage element and through openings in said heat radiation barrier foils such that its lowermost end extends towards said sole plate, wherein at least one end of the bimetallic lamella is fixedly attached to said sole plate and wherein the opposite end of the bimetallic lamella is movable away from said sole plate when heated to contact the lowermost end of the elongated control element to first move the elongated control element and then said heat storage element away from the top heat radiation barrier foil located between upper end surfaces of the projections extending away from the top surface of said sole plate.

7. A cordless flatiron as defined in claim 6 wherein the uppermost end of the elongated control element extends into the sealed chamber from the top face of said heat storage element, and wherein a spring is connected between the protective hood and the uppermost end of the elongated control element to help control the positioning of the elongated control element, together with said heat storage element, with respect to the upper surfaces of the projections extending away from the top surface of said sole plate.

8. A cordless flatiron as defined in claim 7 wherein means are connected to said heat storage element to cause it to snap into one of two positions, the first position wherein the bottom face of said heat storage element is in contact with the top heat radiation barrier foil which is itself in contact with the upper surfaces of the projections extending away from the top surface of said sole plate and the second position wherein said heat storage element is out of contact with the top heat radiation barrier foil.

9. A cordless flatiron as defined in claim 7 wherein a control means is provided to adjust the force applied by the spring on the second end of the elongated element.

10. A cordless flatiron as defined in claim 7 wherein a threaded control pin is mounted in a threaded mounting element in the sealed chamber, the lower end of the threaded control pin contacting the upper side of the spring and the upper end being connected to a magnetized head located within the chamber near the roof of said protective hood, and wherein a magnetized knob is located adjacent the magnetized head but outside the chamber, the spring, threaded control pin, magnetized head and magnetized knob forming a temperature selector for the sole plate of the flatiron, rotation of the magnetized knob controlling the downward force exerted on the elongated control element and thus the temperature to which the bimetallic lamella must be heated before it moves said heat storage element away from the top radiation barrier foil.

11. A cordless flatiron as defined in claim 31 including an additional heat radiation barrier means positioned in the sealed chamber between said heat storage element and said protective hood.

12. A cordless flatiron as defined in claim 11 wherein the additional heat radiation barrier means comprises a number of heat radiation barrier foils.

13. A cordless flatiron as defined in claim 1 including an adjustable heat storage quantity selector element electrically connected between the heating means and the electrical connector means to control the supply of electricity to the heating means.

14. A cordless flatiron as defined in claim 1 wherein the electrical connector means is formed as a socket.

* * * * *